United States Patent

Crabbe et al.

[15] 3,681,410

[45] Aug. 1, 1972

[54] PROCESS FOR PREPARING 17α-HYDROXY-20-KETO AND 17α,21-DIHYDROXY-20-KETO PREGNANES AND DERIVATIVES AND INTERMEDIATES THEREOF

[72] Inventors: Pierre Crabbe; Esperanza Velarde, both of Mexico City, Mexico

[73] Assignee: Syntex Corporation, Panama, Panama

[22] Filed: Aug. 7, 1970

[21] Appl. No.: 62,201

Related U.S. Application Data

[63] Continuation-in-part of Ser. No. 854,742, Sept. 2, 1969, abandoned.

[52] U.S. Cl. ............... 260/397.3, 195/51, 260/239, 260/55 C, 260/397, 260/397.4, 260/397.45, 260/397.47, 260/397.5, 260/999
[51] Int. Cl. ............................................. C07c 169/10
[58] Field of Search ........... 260/397.3, 397.4, 397.45, 397.47, 260/397.5, 239.55 C

[56] References Cited

UNITED STATES PATENTS

2,983,735  5/1961  Ruggieri .................... 260/397.4
3,117,966  1/1964  Petrow ..................... 260/239.55

Primary Examiner—Lewis Gotts
Assistant Examiner—Ethel G. Love
Attorney—Evelyn K. Merker

[57] ABSTRACT

New processes for preparing 17α-hydroxy-20-keto and 17α,21-dihydroxy-20-keto pregnanes and derivatives thereof, which compounds are useful as progestational and anti-inflammatory agents. The processes utilize the steps of converting a 17α-ethynyl-17β-acyloxy steroid to the corresponding 17-vinylidene steroid with zinc in an ethylene glycol ether and oxidizing the 17-vinylidene steroid to form the corresponding product pregnanes. The novel 17-vinylidene compounds are useful as intermediates as herein described and are also useful anti-androgenic agents.

25 Claims, No Drawings

PROCESS FOR PREPARING 17α-HYDROXY-20-KETO AND 17α,21-DIHYDROXY-20-KETO PREGNANES AND DERIVATIVES AND INTERMEDIATES THEREOF

This is a continuation-in-part of patent application, Ser. No. 854,742, filed Sept. 2, 1969, now abandoned.

The present invention relates to a new process for the preparation of therapeutically valuable steroid derivatives and to novel intermediate compounds useful in this process. In particular, the present invention is directed to a process for the preparation of 17α-hydroxy-20-keto and 17α,21-dihydroxy-20-ketopregnane steroids and derivatives thereof via novel, useful 17-vinylidene intermediates.

Steroid compounds which bear the 17α-hydroxy-20-keto and 17α,21-dihydroxy-20-keto system, the latter commonly referred to as the dihydroxy acetone side chain, demonstrate important and potent biological activities. It is known that 17α-hydroxy-20-keto steroids, such as hydroxyprogesterone and various derivatives thereof, for example, acetoxyprogesterone, chlormadinone acetate, and the like, possess progestational activity making them useful in fertility control and in the management of various menstrual disorders. It also has been demonstrated that steroids having oxygen functions at positions C-17, C-20, and C-21 possess anti-inflammatory activity which make them useful as agents for the treatment of arthritis, allergic dermatitis, contact dermatitis, and like conditions. Examples of compounds in this series of steroid which possess and have been used in accordance with such activity are beta-methasone, cortisone, dexamethasone, hydrocortisone, methylprednisolone, paramethasone, prednisolone, prednisone, and triamcinolone. Many other steroids having the requisite 17α-hydroxy-20-keto or 17α,21-dihydroxy-20-keto system which exhibit progestational and/or corticoidal activity are known and have been described repeatedly, for example, in *Steroid Drugs* by Norman Applezweig; Vol. 1, McGraw Hill Book Company, Inc., 1962, and Vol. 2, Holden Day, Inc., 1964.

Typical 17α-hydroxy-20-keto and 17α,21-dihydroxy-20-keto compounds which are prepared in accordance herewith are those of the following partial formula:

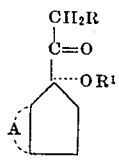

wherein, A is the remainder of the steroid molecule comprising the A, B, and C rings, R is hydrogen, hydroxy, or acyloxy, and R¹ is hydrogen or acyl.

The present invention is directed to new processes and intermediates useful for the preparation of 17α-hydroxy-20-keto and 17α,21-dihydroxy-20-keto steroids of the pregnane series.

By employing, for the sake of convenience and simplicity, partial formulas of Ring D of the steroid molecule, the methods by which these compounds can be prepared in accordance herewith can be graphically depicted according to the following reaction sequence:

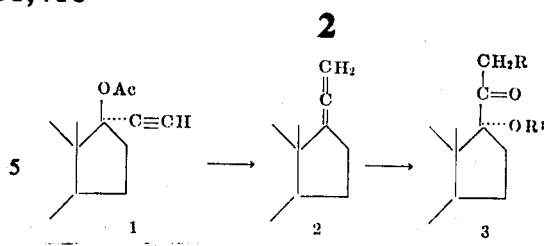

wherein Ac is lower acyl and each of R and R¹ is as defined above.

The present invention in a first, principal aspect resides in a process comprising the step of treating a 17α-ethynyl-17β-acyloxy-steroid of the estrane or androstane series (1) with zinc in an ethylene glycol ether to yield the corresponding 17-vinylidenesteroid (2).

The present invention is a second, principal aspect resides in a process comprising the steps of treating a 17α-ethynyl-17β-acyloxysteroid of the estrane or androstane series (1) with zinc in an ethylene glycol ether to yield the corresponding 17-vinylidenesteroid (2) and oxidizing the resulting 17-vinylidenesteroid (2).

The present invention in a third, principal aspect resides in novel compounds depicted by partial Formula (2) above and defined more completely hereinafter. These compounds are useful as intermediates as herein described and as anti-androgenic agents useful for example in the treatment of benign prostatic hypertrophy, hypersexuality in males, juvenile acne, and so forth.

In the foregoing process, the second (oxidation) step furnished the 17α-hydroxy-20-keto or 17α,21-dihydroxy-20-keto compounds or ester derivatives thereof (3). Thus, the usefulness of the first aspect resides in the process for preparing 17-vinylidene steroids which are useful as (anti-androgenic agents and) intermediates for the preparation of the 17α-hydroxy-20-keto and 17α,21-dihydroxy-20-keto products hereof.

In accordance with the embodiments of the first aspect process of the present invention, a starting compound possessing in part the skeleton formula outlined by Formula (1) above is reacted together with zinc in an ethylene glycol ether. Suitable ethylene glycol ethers include the mono and di lower alkyl ethers in the diethylene glycol and triethylene glycol series such as diethylene glycol dimethyl ether, diethylene glycol diethyl ether, diethylene glycol monoethyl monobutyl ether, diethylene glycol monomethyl ether, triethylene glycol monoethyl ether, triethylene glycol monomethyl monopropyl ether, triethylene glycol monobutyl ether, triethylene glycol dimethyl ether, triethylene glycol monopropyl ether, and the like. Preferred is diethylene glycol dimethyl ether (diglyme). This reaction is further conducted at a temperature ranging from about 140° C. to about 220° C. and preferably at the boiling point of the reaction mixture and under reflux and for a period of time sufficient to complete the reaction ranging from a few minutes to several hours, commonly from about 6 to about 8 hours.

The reaction is performed under anhydrous conditions, at least in the initial stages of the reaction. Thus, in the preferred embodiments, anhydrous reaction conditions are followed for the entire reaction to completion or from the beginning and for a substantial period substantially depending upon the total time of the reaction.

The ethylene glycol ether is conveniently pre-treated with zinc prior to the addition of starting steroid. Only as respect a preferred embodiment, this pre-treatment involves stirring or otherwise mixing the ethylene glycol ether with zinc dust for a period of time ranging from about a few minutes up to several hours and preferably at about room temperature. It can then be filtered and subsequently used together with the starting steroid and zinc in the principal reaction.

In accordance with the embodiments of the second aspect process of the present invention, the 17-vinylidene compound is prepared as described above and is then oxidized with oxidizing agent. Suitable oxidizing agents include osmium tetroxide, either alone or in combination with hydrogen peroxide; a percarboxylic acid, such as peracetic, perbenzoic, m-chloroperbenzoic, perphthalic, persuccinic, pertrifluoroacetic, and performic; phenyliodoso acetate; and morpholine. These oxidizing agents are known per se and their manners of use have been described in the literature. See Fieser and Fieser, *Steroids*, Reinhold Publishing Co., New York, 1959, page 659, and Hogg et al., *Journal of the American Chemical Society* 77, 4438 (1955), and Miescher, *Helv. Chem. Acta* 33, 1840 (1950) and the references cited therein, all hereby incorporated by reference.

The oxidation reaction is conveniently performed in the presence of inert, liquid organic reaction medium and at temperatures ranging from about 0° C. up to the boiling point of the reaction mixture. Suitable media include the tertiary alkanols such as tertiary butanol, tertiary amyl alcohol and the like, and mixtures thereof; the hydrocarbon solvents such as hexane, heptane, isoctane, decane, and the like, and mixtures thereof; the cycloalkyl hydrocarbon solvents, such as cyclopentane, cyclohexane, and the like, and mixtures thereof; the monocyclic aryl hydrocarbon solvents, such as benzene, toluene, cumene, xylene, and the like, and mixtures thereof; and the chlorinated methanes, such as methylene chloride, chloroform, and the like, and mixtures thereof. The choice of liquid reaction media is made taking into consideration any potential interference or competition which may develop with the particular oxidizing agent employed, in accordance with the level of ordinary skill of the art.

In the practice of the oxidation step, the choice of reactants, that is, oxidizing agent dictates whether a 17α-hydroxy-20-keto compound or a 17α,21-dihydroxy-20-keto compound or a derivative thereof will be prepared. When an oxidizing agent other than a peracid is employed, the 17α,21-dihydroxy-20-keto corticoid compounds are formed. These can be acylated as a second step to the corresponding 17α-hydroxy-21-acyloxy-20-keto products.

Conversely, in those instances wherein peracid is employed as oxidizing agent, a mixture of products is obtained. The compounds of this mixture are products of peracid participation in the reaction, that is, acyloxy moieties derived from the acids used are introduced in the molecule so as to prepare the 17α-acyloxy-20-keto pregnanes and 17α-hydroxy-21-acyloxy-20-keto compounds.

In carrying out the above described reaction steps, the respective starting compound and the respective reactant(s) are contacted and maintained together in any convenient order or fashion, in accordance with the preferences described. The reaction mixtures are then maintained within the given temperature range for a period of time sufficient to complete the reaction. Upon the completion of the respective reaction, the reaction mixture is processed by conventional procedures, such as dilution, filtration, extraction, decantation, distillation, evaporation, chromatography, and so forth to recover and isolate the desired product.

The given reactions consume the respective reactants in the ratio of one mole of the starting compound per mole of zinc and ethylene glycol ether and per two moles of oxidizing agent. However, the amounts of the reactants to be employed are not critical, some of the desired product being obtained when employing any proportions thereof. In the preferred embodiments hereof, the appropriate zinc and ethylene glycol ether reactants are employed in amounts ranging from about 25 to 50 moles up to about 500 moles per mole of the respective starting steroid compound and the oxidizing agent in the amount ranging from about 2 moles to about 10 moles per mole of the respective starting steroid compound.

The reaction can be conducted in the presence of catalytic amounts of a strong acid such as a mineral acid like hydrochloric acid, however, this is not essential.

The process of the present invention is particularly useful for the preparation of basic pregnane compounds which exhibit progestational and anti-inflammatory activity but, more importantly, which are also very suitable as nuclei which can be further elaborated, in accordance with known and standard methods, to prepare compounds exhibiting progestational and anti-inflammatory activities considered valuably potent in the steroid art. For example, the process hereof is notably suited for the preparation of such basic compounds as hydrocortisone and cortisone or the 16-methyl or 16-hydroxy derivatives thereof.

The present process can be used with basic 17α-ethynyl-17β-acyloxy starting compounds to prepare basic pregnanes which can be elaborated further. Thus, the process can be practiced upon 3-keto-17α-ethynyl-17β-acyloxy-Δ$^4$ compounds or upon 4,5-dihydro-3β-hydroxy (ethers or ketals). In the latter instance, the C-3 ether groups can then be cleaved, the 3-hydroxyl oxidized to the ketone, and the Δ$^4$ unsaturation introduced according to the conventional procedures described hereinafter. In either instance, the 3-keto-Δ$^4$ compounds are further elaborated as respect the introduction of C-6 and C-9 and C-11 halo groups, Δ$^1$ unsaturation, C-11 hydroxy, and so forth to prepare such useful compounds as flumethasone, prednisolone, prednisone, fluocinolone acetonide, and the like.

The specific choice of starting material and the further elaboration is within the ordinary level of skill in the steroid art in accordance with the present disclosure.

In the preferred embodiments hereof, the present invention is useful for the preparation of 17α-hydroxy-20-keto and 17α,21-dihydroxy-20-keto compounds having the following Formula (A):

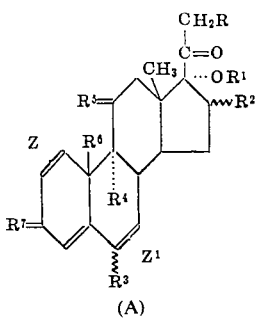

(A)

and the 4,5-dihydro derivatives thereof;
wherein each R and $R^1$ is as defined above;
$R^2$ is hydrogen, lower alkyl, halogenated methyl, hydroxy or a conventional hydrolyzable ester or ether thereof;
$R^3$ is hydrogen, fluoro, chloro, bromo or methyl;
$R^4$ is hydrogen, fluoro, chloro or bromo, provided $R^4$ is chloro when $R^8$ is chloro;
$R^5$ is oxo or the group

wherein $R^8$ is hydrogen, hydroxy or chloro;
$R^6$ is hydrogen or methyl;
$R^7$ is oxo, ethylenedioxy, or the group

wherein $R^9$ is hydrogen, hydroxy or a conventional hydrolyzable ester or ether thereof; and
each of Z and $Z^1$ is a carbon-carbon single bond, a carbon-carbon double bond, or the group

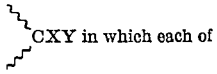 in which each of

X and Y is hydrogen, chloro, or fluoro;
provided that when $R^6$ is hydrogen, Z is a single bond.

The compounds represented by the above Formula (A) possess progestational or anti-inflammatory activity and are thus useful, as set forth above. Generally, those having a 11β and/or 21-hydroxy group are anti-inflammatory agents, the remainder being progestational compounds. In addition, however, the compounds of Formula (A) are also useful as intermediates for the preparation of other steroids which also possess varying degrees of progestational or cortical activity making then also useful in fertility control and in the treatment of various inflammatory conditions.

As indicated above, these compounds can be prepared directly from the corresponding 17-oxo compounds or they are obtainable, in the preferred embodiments, upon further elaboration of a basic pregnane product.

The novel 17-vinylidene intermediate steroids of the present invention are the 17-vinylidene compounds otherwise corresponding to the compounds of Formula (A). A particularly valuable group of these compounds are those represented by the following Formula (B):

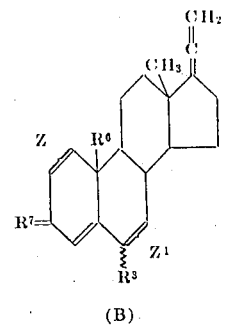

(B)

wherein,
$R^3$ is hydrogen, chloro, bromo, fluoro or methyl;
$R^6$ is hydrogen or methyl;
$R^7$ is oxo or the group

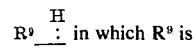 in which $R^9$ is hydrogen, hydroxy or a conventional hydrolyzable ester or ether thereof;
each of Z and $Z^1$ is a carbon-carbon single bond, a carbon-carbon double bond, or the group

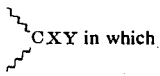 in which each of X and Y is hydrogen, fluoro or chloro;
provided that when $R^6$ is hydrogen, Z is a carbon-carbon single bond.

Preferably, the starting compounds possess the desired substitution in Ring A and B, e.g., a keto or esterified β-hydroxyl group at C-3; chloro, bromo or a methyl group at C-6, methylene and halomethylene groups at C-1,2 and/or C-6,7, or alternatively, groups which on further transformation give the desired substituent, such as 1,2 and/or 6,7-oxido groups. Double bonds at C-1 and/or C-6 may also be present in the starting compounds or may be introduced after the main reaction by following methods known to the skilled in the art.

The compounds depicted and defined above which can be prepared in accordance with the processes hereof can be converted, via conventional means known to one skilled in the art, to other useful derivatives. The C-17 and C-21 hydroxyl groups, if present, can be conventionally esterified, the primary alcohol requiring use of a carboxylic acid anhydride in the presence of, for example, pyridine and the 17α-tertiary alcohol requiring use of carboxylic acid anhydride in the presence of acetic acid and p-toluenesulfonic acid. Similarly they can be etherified to the conventional ethers in accordance also with methods known in the art.

If desired, the 3-keto compounds can be obtained by other than direct methods upon oxidation (with chromic acid in pyridine) of a 3β-hydroxy compound followed by treatment of the 3-keto compounds with bromine in acetic acid in the presence of hydrogen bromide to yield the corresponding 2,4-dibromo-3-keto compound. This dibromo adduct is refluxed with sodium iodide in 2-pentanone to yield the corresponding 2-iodo-3-keto-$\Delta^4$ compound which, when refluxed with collidine, yields the corresponding 3-keto-$\Delta^4$ derivative.

By refluxing the 3-keto-Δ⁴ derivative with 2,3-dichloro-5,6-dicyano-1,4-benzoquinone in dioxane, the corresponding 3-keto-Δ¹,⁴ derivative is obtained. By refluxing the 3-keto-Δ⁴ derivative with chloranil and xylene, the corresponding 3-keto-Δ⁴,⁶ derivative is obtained.

The corresponding 11β-hydroxy derivative of the above depicted and defined compounds can be prepared by incubating the C-11 dihydro compounds with any hydroxylating microorganism, such as Cunninghamella Bainieri or Curvalaria Lunata, in an appropriate nutrient medium or by selective reduction of a 11-keto group.

The 3-keto-Δ⁴ compounds can be converted into the corresponding 6-fluoro derivatives by transformation into the 3-ethylenedioxy-Δ⁵ compounds followed by treatment with hydrofluoric acid and N-bromoacetamide in the presence of a proton acceptor, followed by dehydrobromination and isomerization of the 6β-fluoro to the α-isomer by acid treatment, or by conversion of the 3-keto-Δ⁴ compounds into the 3-enol ethers or enol esters and reaction of the enol compounds with perchloryl fluoride followed by acid treatment. When the 3-enol ethers are reacted with N-chlorosuccinimide there are obtained the corresponding 6β-chloro-Δ⁴-3-keto compounds which are converted into the 6α-isomers by acid treatment. The respective 6-bromo compounds are obtained by using N-bromosuccinimide. In the preferred embodiments hereof, it is preferred to introduce a chloro or bromo substituent at C-6 after the introduction of the vinylidene group or at total process end.

The 3-keto-Δ⁴ compounds can also be converted into the corresponding 3β-hydroxy compounds by reduction with a double metal hydride such as lithium tri(tertiarybutoxi)aluminum hydride, zinc borohydride and the like, and the 3-hydroxy group esterified later with carboxylic acid anhydrides or carboxylic acid chlorides in pyridine solution, or etherified with dihydropyran, dihydrofuran, or 4-methoxy dihydropyran in the presence of an acid catalyst.

Protection is preferably provided for those groups present in the starting compound which may compete or interfere with the principal reactions hereof or with the processes preparative to the principal reactions hereof. The oxidation step hereof requires that any hydroxyl groups which are present on the starting material be protected by either esterifying them with a carboxylic acid anhydride such as acetic anhydride, propionic anhydride, caproic anhydride, and the like in a tertiary amine solvent such as triethyl amine, pyridine, quinoline, and the like or by etherification. A mild subsequent hydrolysis restores the hydroxyl group.

In accordance with the above, products which can be prepared in accordance with the preferred embodiments hereof and also in accordance with the generic process of the present invention, the starting materials which are represented above by partial Formula 1, are optionally substituted with alkyl, halogenated alkyl, hydroxy, acyloxy, halogeno, alkoxy, oxido, methylene, acetyl, ketal, cyano, and the like. For example, the starting materials can be substituted with 2,3-isopropylidenedioxy, 1-acetylthio, 1-cyano, 1,2-oxido, 2-alkyl, 2-formyl, 2-halo, 4-hydroxy, 4-acetoxy, 4-halo, 5-hydroxy, 5-acetoxy, 4,5-oxido, 6-hydroxy, 6-acetoxy, 6-halogenated methyl, 6-fluoro, 6-methyl, 5,6-oxido, 9-halo, 11-keto, 11-hydroxy, 11-halo, 9,11-oxido, 12-alkyl, 12-hydroxy, 15-alkyl, 15-hydroxy, 16-alkanoyloxy, 16-alkyl, 16-halogenated methyl, 15,16-oxido, 18-alkyl, 19-alkyl, 19-hydroxy, 19-carboxy and the like.

The starting compounds for the present invention are known or they can be prepared by treating a 17-ketoandrostane with an ethynylating agent in accordance with known, conventional methods to prepare the corresponding 17α-ethynyl-17β-ol compound and thereafter conventionally esterifying this derivative to the corresponding 17α-ethynyl-17β-acyloxy compound. The conventional ethynylation involves the use of an alkali metal acetylide or acetylene, alkali metal alkoxide and dimethyl sulfoxide-see U.S. Pat. Nos. 3,126,376 and 3,470,270 and the conventional esterification involves the use of carboxylic acid anhydride in benzene with acid catalyst.

Such compounds are described, inter alia, in U.S. Pats. Nos. 2,843,609, 2,964,547, 2,946,809, 3,028,401, 3,047,592, 3,062,844, 3,064,014, 3,080,391, 3,096,355, 3,102,897, 3,178,412, 3,270,037, 3,338,928, 3,414,592, 3,444,295, 3,452,058 and 3,462,465. The 3ββ-diacyloxy-17α-ethynyl-Δ⁴-starting compounds can be obtained by reduction of the corresponding Δ⁴-3-keto androstene or estrene derivatives with lithium tri(tertiary butoxy)aluminum hydride or another double metal hydride followed by conventional esterification of the hydroxy groups at C-3 and C-17.

In the present specification and claims, the following definitions apply.

The wavy line ( ∿ ) used in the depicted formulas indicates that the substituents attached to those positions can be either in the configuration alpha (α) or beta (β) or mixtures thereof.

The term "conventional hydrolyzable ester" denotes those hydrolyzable ester groups conventionally employed in the steroid art, preferably those derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from one to 12 carbon atoms. In addition, they can be substituted by functional groups, for example, hydroxy, alkoxy containing up to six carbon atoms, acyloxy containing up to twelve carbon atoms, nitro, amino, halogeno, and the like, attached to the hydrocarbon backbone chain. Typical conventional hydrolyzable esters thus included within the scope of the term and the instant invention are acetate, propionate, valerate, caproate, enanthate, caprylate, perlargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloroacetate, β-chloropropionate, trichloroacetate, β-chlorobutyrate, bicyclo-[2.2.2]-octane-1-carboxylate, 4-methylbutylo-[2.2.2]-oct-2-ene-1-carboxylate and the like. The preferred conventional ester is acetate.

"Conventional hydrolyzable ethers" include the cyclopentyl, tetrahydrofuran-2'-yl, tetrahydropyran-2'-yl, and 4'-methoxy-tetrahydropyran-4'-yl ethers.

The term "lower alkyl" defines aliphatic hydrocarbons of from one to six carbon atoms including all isomers thereof. Typical lower alkyl groups are methyl, ethyl, isopropyl, t-butyl, isoamyl and n-hexyl.

The term "halogenated methyl" defined a methyl group substituted with one, two or three halogen groups, preferably chloro and fluoro. Typical halogenated methyl groups include fluoromethyl, chloromethyl, difluoromethyl, chlorofluoromethyl, trichloromethyl, trifluoromethyl and the like.

The terms "acyl" or "acyloxy" define acyl and acyloxy groups derived from lower alkanoic acids containing from two to four carbon atoms, that is, acetic, propionic, and the butyric acids or those derived from the peracids within the scope hereof.

The following examples typify the manner by which the present invention can be practiced and represent, in one aspect, the best mode for carrying out the invention. As such, they should be construed merely as illustrative and not as limitative upon the overall scope hereof.

PREPARATION 1

A solution of 1 g. of 3β-acetoxy-5α-androstan-17-one, in 30 ml. of anhydrous benzene is added under nitrogen to a solution of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 3β-acetoxy-17α-ethynyl-5α-androstan-17β-ol which is recrystallized from acetone:hexane.

To a solution of 10 g. of 3β-acetoxy-17α-ethynyl-5α-androstan-17β-ol in 250 ml. of anhydrous benzene are added 2 g. of p-toluenesulfonic acid and 10 ml. of acetic anhydride, and the mixture is allowed to stand for 24 hours at room temperature, poured into ice-water and the resulting mixture stirred to effect hydrolysis of the excess anhydride. The benzene layer is separated and washed with 10 percent sodium carbonate solution and water. Drying, evaporation and crystallization of the residue from acetone-hexane affords 3β,17β-diacetoxy-17α-ethynyl-5α-androstane.

In like manner, by following the esterification procedure in the immediately foregoing paragraph, but substituting propionyl anhydride, butyryl anhydride, pentanoyl anhydride, caproyl anhydride, heptanoyl anhydride, and capryloyl anhydride for acetic anhydride there are obtained the corresponding 17β-propionyloxy, -butyryloxy, -pentanoyloxy, -caproyloxy, -heptanoyloxy, and -capryloxy esters in the 3β-acetoxy-17α-ethynyl-5α-androstane series.

In like manner, the foregoing processes can be used to prepare the following representative compounds:

6α-methyl-17α-ethynyl-17β-acetoxyestr-4-en-3-one,
6α-chloro-17α-ethynyl-17β-acetoxyandrost-4-en-3-one,
6α-chloro-17α-ethynyl-17β-acetoxyestr-4-en-3-one,
6α-fluoro-17α-ethynyl-17β-acetoxyandrost-4-en-3-one,
6β-fluoro-17α-ethynyl-17β-acetoxyandrost-4-en-3-one,
6α-fluoro-17α-ethynyl-17β-acetoxyestr-4-en-3-one,
6α,7α-difluoromethylene-17α-ethynyl-17β-acetoxyandrost-4-en-3-one,
6α,7α-methylene-17α-ethynyl-17β-acetoxyandrost-4-en-3-one,
6α,7α-difluoromethylene-17α-ethynyl-17β-acetoxyester-4-en-3-one,
6α,7α-methylene-17α-ethynyl-17β-acetoxyestr-4-en-3-one,
1α,2α-difluoromethylene-17α-ethynyl-17β-acetoxyandrost-4-en-3-one,
1α,2α-methylene-6α,7α-difluoromethylene-17α-ethynyl-17β-acetoxyestr-4-en-3-one,
6α-methyl-17α-ethynyl-17β-acetoxyestr-4-ene,
6-methyl-17α-ethynyl-17β-acetoxyandrosta-4,6-dien-3-one,
6-chloro-17α-ethynyl-17β-acetoxyestra-4,6-dien-3-one,
6-fluoro-17α-ethynyl-17β-acetoxyestra-4,6-dien-3-one,
17α-ethynyl-17β-acetoxyandrosta-1,4,6-trien-3-one,
6α-chloro-17α-ethynyl-17β-acetoxyandrosta-1,4-dien-3-one,
17α-ethynyl-17β-acetoxyandrosta-1,4-dien-3-one,
17α-ethynyl-17β-acetoxyandrost-4-ene, The completely esterified derivatives of:
9α-fluoro-17α-ethynyl-17β-acetoxy-5α-androstane-3β,11β-diol, 16α-methyl-17α-ethynyl-17β-acetoxy-5α-androstan-3β-ol-11-one, 3,3-ethylenedioxy-17α-ethynyl-17β-acetoxy-5α-androstan-16α-ol, 6α-methyl-9α-fluoro-17α-ethynyl-17β-acetoxy-5α-androstane-3β,11β-diol, 6β,16α-dimethyl-17α-ethynyl-17β-acetoxy-5α-androstan-3β-ol, as well as the corresponding 17β-propionyloxy, -butryloxy, -pentanoyloxy, -caproyloxy, -heptanoyloxy, and -capryloyloxy esters thereof.

PREPARATION 2

To a solution of 1 g. of 17α-ethynylandrost-4-en-17β-ol-3-one of 50 ml. of tetrahydrofuran is added 2 g. of lithium tri(tertiary butoxy)aluminum hydride, and the resulting mixture is stirred at room temperature for 1 hour, and then acidified with dilute aqueous acetic acid. The acidified aqueous mixture is extracted with chloroform and the organic extract washed successively with water, aqueous sodium bicarbonate and water to neutrality, dried over sodium sulfate and evaporated to dryness. The residue is recrystallized from ether-methanol, to yield the pure 17α-ethynylandrost-4-ene-3β,17β-diol.

Upon esterification of the foregoing dihydroxy compound by the method of the proceding Preparation there is obtained 3β,17β-diacetoxy-17α-ethynylandrost-4-ene.

PREPARATION 3

To a gently refluxing solution of 1 g. of 6-fluoroandrosta-4,6-dien-17β-ol-3-one in 20 ml. of dimethyl diethylene glycol ether is added with stirring and in a dropwise fashion a 1:2 w/v solution of sodium chlorodifluoroacetate in dimethyl diethylene glycol ether. The addition is stopped after the introduction of further reagent fails to substantially change the U.V. spectrum. The mixture is then filtered and evaporated to dryness. The residue thus obtained is chromatographed on alumina with methylene chloride to yield 6β-fluoro-6α,7α-difluoromethyleneandrost-4-en-17β-ol-3-one.

A solution of 0.6 g. of 6β-fluoro-6α,7α-difluoromethyleneandrost-4-en-17β-ol-3-one in 12 ml.

of pyridine is added to a mixture of 0.6 g. of chromium trioxide in 2 ml. of pyridine. The reaction mixture is allowed to stand at room temperature for 15 hours, diluted with ethyl acetate and filtered through Celite, diatomaceous earth. The filtrate is washed well with water, dried and evaporated to dryness to yield 6β-fluoro-6α,7α-difluoromethyleneandrost-4-ene-3,17-dione.

Through a stirred suspension of 1 g. of sodium methoxide in 8 ml. of dimethylsulfoxide at room temperature, there is passed a slow stream of purified acetylene over a period of 20 minutes. Then it is added a solution of 1 g. of 6β-fluoro-6α,7α-difluoromethyleneandrost-4-ene-3,17-dione in 15 ml. of anhydrous tetrahydrofuran. The introduction of acetylene is continued for three hours. At the end of this time, the reaction mixture is poured into 100 ml. of water containing 0.2 ml. of concentrated sulfuric acid. The tetrahydrofuran is evaporated and the solid which forms is collected by filtration, washed with water to neutrality and air dried. This material is clarified with charcoal and recrystallized from acetone to yield 6β-fluoro-6α,7α-difluoromethylene-17α-ethynylandrost-4-en-17β-ol-3-one, which is converted into the 17β-acetate by following the esterification method of Preparation 1.

EXAMPLE 1

Anhydrous diethylene glycol dimethyl ether (2 lt.) is stirred with 100 g. of zinc dust for a period of two hours. Following this period, the resultant mixture is filtered and to the filtrate is added 100 g. of 17β-acetoxy-17α-ethynylandrost-4-en-3-one. To the resultant mixture are then added 1,000 g. of zinc dust with stirring in a portion-wise fashion, in a one hour period. Following this addition, the resultant mixture is heated to the boiling point and maintained under reflux and anhydrous conditions for 7 ½ hours. The reaction mixture is then filtered, the solid is washed with 1 lt. of hot chloroform and the combined organic solutions evaporated to dryness under reduced pressure. The residue is chromatographed on alumina eluting with hexane:methylene chloride (95:5) to obtain 17-vinylideneandrost-4-en-3-one.

In a similar manner, the 17β-acetoxy-17α-ethynylestr-4-en-3-one, 17β-acetoxy-6α-chloro-17α-ethynylandrost-ONE AND -&-propionoxy-6α, 7α-methylenestr-4-en-3-one are converted respectively into 17-vinylidenestr-4-en-3-one, 6α-chloro-17-vinylideneandrost-4-en-3-one and 6α, 7α-methylene-17-vinylidenestr-4-en-3-one.

EXAMPLE 2

One hundred milliliters of diethylene glycol dimethyl ether is distilled. The distillate is refluxed over sodium metal for a period of 2 hours, after which time it is removed by distillation. Fifteen milliliters of the thus prepared anhydrous diethylene glycol dimethyl ether is stirred together with zinc dust for a period of 2 hours at room temperature. After this time, the mixture is filtered and to the filtrate is added 1 g. of 3β, 17β-diacetoxy-17α-ethynylestra-4,6-diene, at room temperature. To the resultant solution are added 10 g. of zinc dust in a portionwise fashion at room temperature. Following the addition, the reaction mixture is heated to the boiling point and maintained under reflux conditions for 7 hours. During this entire period, the anhydrous conditions are maintained. Following the reflux period, the solution is filtered, concentrated under high vacuum, and the residue chromatographed over Florisil eluting with hexane-ether (95:5) to provide the 3β-acetoxy-17-vinyl-idenestra-4,6-diene product.

By the same method 3β, 17β-diacetoxy-17α-ethynylandrosta-4,6-diene, 3β,17β-diacetoxy-17α-ethynylestr-4-ene and 3β,17β-diacetoxy-6α-methyl-17α-ethynylandrost-4-ene are converted respectively into 3β-acetoxy-17-vinylidene androsta-4,6-diene, 3β-acetoxy-17-vinylidenestr-4-ene and 3β-acetoxy-6α-methyl-17-vinylideneandrost-4-ene.

EXAMPLE 3

One gram of 6α-methyl-17β-propionoxy-17α-ethynyl-estr-4-ene is added to 50 ml. of anhydrous diglyme (prepared as described in Example 2, above) at room temperature with stirring. To the resultant solution are added 15 g. of zinc dust while maintaining the mixture at room temperature and under stirring. After the addition of the zinc dust, 5 drops of 36 percent hydrogen chloride are added to the resultant mixture. The reaction mixture is then heated to the boiling point and maintained under reflux and anhydrous conditions for 15 hours. The mixture is then filtered, concentrated and the resultant residue chromatographed over florisil eluting with hexane-ether (95:5) to afford 6α-methyl-17-vinylidenestr-4-ene.

EXAMPLE 4

A portion of anhydrous triethylene glycol dimethyl ether is prepared in accordance with the procedure set forth in Example 2, for diethylene glycol dimethyl ether. The resulting anhydrous triethylene glycol dimethyl ether is then treated with zinc dust at reflux temperatures as described for diethylene glycol dimethyl ether in Example 1. To the resulting zinc treated, anhydrous triethylene glycol dimethyl ether is added 1 g. of 1α,2α-difluoromethylene-17β-acetoxy-17 α-ethynylandrost-4-en-3-one. To the resulting solution is then added, at room temperature and with stirring, 25 g. of zinc dust in a portion-wise fashion. Following this addition, the reaction mixture is raised to the boiling point and maintained under reflux and anhydrous conditions for a period of 6 hours. The reaction mixture is then filtered, concentrated, and the residue chromatographed on florisil thus yielding 6α,2α-difluoromethylene-17-vinylideneandrost-4-en-3-one.

EXAMPLE 5

Fifty milliliters of diethylene glycol monoethyl ether is made anhydrous and pretreated with zinc dust in accordance with the methods set forth in Examples 1 to 4, above. To this anhydrous, pretreated diethylene glycol monoethyl ether are added 2 g. of 6β-fluoro-6α,7α-difluoromethylene-17α-ethynyl-17β-acetoxyandrost-4-en-3-one. To the resulting solution are added 50 g. of zinc dust in a portion-wise fashion and at room temperature while stirring. Following the addition of the zinc dust, 1 ml. of 36 percent hydrogen chloride solution is added to the reaction mixture. The reaction mixture is then heated at the boiling point for a period of three hours while maintaining the entire mixture under anhydrous conditions. Following the reflux period, the solution is filtered, concentrated, and the residue chromatographed to yield 6β-fluoro-6α,7α-difluoromethylene-17-vinylideneandrost-4-en-3-one.

EXAMPLE 6

One hundred milliliters of anhydrous diethylene glycol dimethyl ether which has been pretreated with zinc is prepared as described in the foregoing examples. To this is added one gram of 1α,2α-methylene-17β-acetoxy-17α-ethynylestr-4-en-3-one. To the resultant solution are added 10 g. of zinc dust in a portion-wise fashion with stirring and at room temperature. Following the addition of the zinc dust, the reaction mixture is heated to the boiling point and maintained under reflux conditions for a period of 15 hours. During the first 8 hours of the reflux period, measures are taken to maintain the reaction mixture anhydrous. Following the reflux period, the solution is filtered and the filtrate is evaporated to dryness under reduced pressure. Chromatography of the residue on washed alumina yields 1α,2α-methylene-17-vinylidenestr-4-en-3-one.

EXAMPLE 7

Part A— 3β-Acetoxy-17-vinylidene-5α-androstane

Anhydrous diethylene glycol dimethyl ether (40 ml.) is stirred with zinc dust for a period of 2 hours. Following this period, the resultant mixture is filtered and to the filtrate is added 1 g. of 3β,17β-diacetoxy-17α-ethynyl-5α-androstane. To the resultant mixture are then added 12 g. of zinc dust with stirring in a portion-wise fashion. Following this addition, the resultant mixture is heated to the boiling point and maintained under reflux and anhydrous conditions for 7 ½ hours. The reaction mixture is then filtered and concentrated under vacuum to obtain a residue. The residue is chromatographed on florisil eluting with hexane:ether (95:5) to obtain the 3β-acetoxy-17-vinylidene-5α-androstane product.

Part B-1 — 3β-Acetoxy-5α-pregnane-17α,21-diol-20-one

A solution of 200 mg. of 3β-acetoxy-17-vinylidene-5α-androstane dispersed in 0.5 ml. of pyridine is added to a mixture of 3 ml. of benzene containing 350 mg. of osmium tetroxide. After the addition, the resultant mixture is allowed to stand at 20° C. for 15 hours. After this time, a solution of 50 ml. of water containing 3 g. of sodium sulfite and 3 g. of potassium bicarbonate is added. The benzene is then quenched on a vacuum and a few milliliters of ethanol are poured into the mixture. The resultant mixture is then stirred at 20° C. for 12 hours. Following this period, a few drops of acetic acid are added until the mixture is neutral. The reaction mixture is then evaporated and extracted with chloroform to provide the 3β-acetoxy-5α-pregnane-17α,21-diol-20-one product which can be further purified by chromatography on florisil.

Part B-2 — 3β-Acetoxy-5α-pregnane-17α,21-diol-20-one

To a solution of 200 mg. of 3β-acetoxy-17-vinylidene-5α-androstane dispersed in 80 ml. of diethyl ether, there is added 1 g. of osmium tetroxide in three drops of water. The reaction is allowed to stand at room temperature for 10 days and is then filtered. The ethereal filtrate is washed with sodium thiosulfate solution and water, dried over sodium sulfate, and evaporated. The residue purified on chromatographic magnesium silicate eluting with hexane, and then with hexane:ethyl acetate (4:1) to yield the 3β-acetoxy-5α-pregnane-17α,21-diol-20-one product.

Part B-3 — 3β-Acetoxy-17α-(3'-chlorobenzoyloxy)-5α-pregnan-20-one and 3β-acetoxy-21-(3'-chlorobenzoyloxy)-5α-pregnan-17α-ol-20-one To a solution of 1 g. of 3β-acetoxy-17-vinylidene-5α-androstane dispersed in 20 ml. of chloroform are added 1.3 g. of 85 percent m-chloroperbenzoic acid. The resultant reaction mixture is allowed to stand at room temperature for 24 hours. After this period it is washed with sodium bicarbonate, dried over sodium sulfate, and evaporated. The residue after evaporation is chromatographed on florisil eluting with benzene:2 percent ethyl acetate to provide the 3β-acetoxy-17α-(3'-chlorobenzoyloxy)-5α-pregnan-20-one and the 3β-acetoxy-21-(3'-chlorobenzoyloxy)-5α-pregnan-17α-ol-20-one product.

EXAMPLE 8

Part A — 9α-Fluoro-17-vinylidene-5α-androstane-3β,11β-diol

One hundred milliliters of diethylene glycol dimethyl ether is distilled. The distillate is refluxed over sodium metal for a period of 2 hours, after which time it is removed by distillation. Fifteen milliliters of the thus prepared anhydrous diethylene glycol dimethyl ether is stirred together with zinc dust for a period of 2 hours at room temperature. After this time, the mixture is filtered and to the filtrate is added 1 g. of 9α-fluoro-17α-ethynyl-17β-acetoxy-5α-androstane-3β,11β-diol at room temperature. To the resultant solution are added 10 g. of zinc dust in a portion-wise fashion at room temperature. Following the addition, the reaction mixture is heated to the boiling point and maintained under reflux condition for 7 hours. During this entire period, the anhydrous conditions are maintained. Following the reflux period, the solution is filtered, concentrated under high vacuum, and the residue chromatographed over florisil eluting with hexane:ether (95:5) to provide the 9α-fluoro-17-vinylidene-5α-androstane-3β,11β-diol product.

Conventional acetylation with acetic anhydride in pyridine at room temperature provides 3β-acetoxy-9α-fluoro-17-vinylidene-5α-androstan-11β-ol.

Part B-1 — 9α-Fluoro-5α-pregnane-3β,11β,17α,21-tetraol-20-one

A mixture of 175 g. of 9α-fluoro-17-vinylidene-5α-androstane-3β,11β-diol and 1.5 l. of diisopropyl ether is added to a mixture of 102 g. of osmium tetroxide, 500 ml. of diisopropyl ether and 5 ml. of water. The resulting mixture is stirred for 4 days at 40° C. cooled and filtered. The filtrate is washed with aqueous sodium thiosulfate solution and water, dried over magnesium sulfate and evaporated. The residue is chromatographed on magnesium silicate eluting with isooctane to yield the 9α-fluoro-5α-pregnane-3β,11β,17α,21-tetraol-20-one product.

Part B-2 — 3β,17α-Diacetoxy-9α-fluoro-5αpregnan-11β-ol-20-one 3β,21-Diacetoxy-9α-fluoro-5α-pregnane-11β,17α-diol-ol-20-one To a mixture of 60 g. of sodium carbonate which is dispersed in 150 ml. of methylene chloride, are added 30 ml. of 13 percent peracetic acid with stirring and at room temperature. The mixture is allowed to stand at room temperature for 75 minutes after which time it is filtered. Sodium sulfate is added to the filtrate and this mixture is again filtered. To the filtrate are added three grams of sodium carbonate and one gram of $3\beta$-acetoxy-$9\alpha$-fluoro-17-vinylidene-$5\alpha$-androstan-$11\beta$-ol. The resultant mixture is stirred at room temperature for 24 hours after which time it is subjected to a vacuum. After removing the vacuum, ethyl acetate is added to the mixture and the resulting mixture is extracted with sodium bicarbonate, water and a saturated solution of sodium chloride. The resulting solution is evaporated to a residue which is chromatographed on Florisil eluding with benzene: 2 percent ethyl acetate to provide the $3\beta,17\alpha$-diacetoxy-$9\alpha$-fluoro-$5\alpha$-pregnan-$11\beta$-ol-20-dione and $3\beta$,21-diacetoxy-$9\alpha$-fluoro-$5\alpha$-pregnane-$11\beta,17\alpha$-diol-20-one products.

EXAMPLE 9

Part A — $16\alpha$-Methyl-17-vinylidene-$5\alpha$-androstan-$3\beta$-ol-11-one

One gram of $16\alpha$-methyl-$17\alpha$-ethynyl-$17\beta$-propionyloxy-$5\alpha$-androstan-$3\beta$-ol-11-one is added to 50 ml. of anhydrous diglyme (prepared as described in Example 2, above) at room temperature with stirring. To the resultant solution are added 15 g. of zinc dust while maintaining the mixture at room temperature and under stirring. After the addition of the zinc dust, 5 drops of 36 percent hydrogen chloride are added to the resultant mixture. The reaction mixture is then heated to the boiling point and maintained under reflux and anhydrous conditions for 15 hours. The mixture is then filtered, concentrated and the resultant residue chromatographed over florisil eluting with hexane:ether (95:5) to provide the $16\alpha$-methyl-17-vinylidene-$5\alpha$-androstan-$3\beta$-ol-11-one product.

Part A-2 — $3\beta$-Acetoxy-$16\alpha$-methyl-17-vinylidene-$5\alpha$-androstan-11-one A mixture of 204 g. of $16\alpha$-methyl-17-vinylidene-$5\alpha$-androstan-$3\beta$-ol-11-one, 600 ml. of pyridine and 300 ml. of acetic anhydride is allowed to stand at room temperature for 24 hours. The mixture is then poured into ice-water and the solid which forms is collected by filtration, washed with water and dried to yield $3\beta$-acetoxy-$16\alpha$-methyl-17-vinylidene-$5\alpha$-androstan-11-one which is further purified through recrystallization from acetone:hexane.

Part B — $3\beta$-Acetoxy-$16\alpha$-methyl-$5\alpha$pregnane-$17\alpha$,21-diol-11,20-dione A mixture of 166 g. of $3\beta$-acetoxy-$16\alpha$-methyl-17-vinylidene-$5\alpha$androstan-11-one in 1.5 l. of tetrahydrofuran is added to a mixture of 456 g. of osmium tetroxide, 500 ml. of tetrahydrofuran and 5 ml. of water. The resulting mixture is stirred for 20 days at 30° C., cooled and filtered. The filtrate is washed with aqueous sodium thiosulfate solution and water, dried over sodium sulfate and evaporated. The residue is chromatographed on chromatographic magnesium silicate eluting with cyclohexane to yield $3\beta$-acetoxy-$16\alpha$-methyl-$5\alpha$-pregnane-$17\alpha$,21-diol-11,20-dione.

EXAMPLE 10

Part A — 3,3-Ethylenedioxy-17-vinylidene-$5\alpha$-androstan-$16\alpha$-ol

A portion of anhydrous triethylene glycol dimethyl ether is prepared in accordance with the procedure set forth in Example 2, for diethylene glycol dimethyl ether. The resulting anhydrous triethylene glycol dimethyl ether is then treated with zinc dust at reflux temperatures as described for diethylene glycol dimethyl ether in Example 1. To the resulting zinc treated, anhydrous triethylene glycol dimethyl ether solution is added 1 g. of 3,3-ethylenedioxy-$17\alpha$-ethynyl-$17\beta$-butyroyloxy-$5\alpha$-androstan-$16\alpha$-ol. To the resulting solution is then added, at room temperature and with stirring, 25 g. of zinc dust in a portion-wise fashion. Following this addition, the reaction mixture is raised to the boiling point and maintained under reflux and anhydrous conditions for a period of 6 hours. The reaction mixture is then filtered, concentrated, and the residue chromatographed on florisil in the manner described in Example 1, to provide the 3,3-ethylenedioxy-17-vinylidene-$5\alpha$-androstan-$16\alpha$-ol product.

Part B — 3,3-Ethylenedioxy-$5\alpha$-pregnane-$16\alpha,17\alpha$,21-triol-20-one To a solution of 500 mg. of 3,3-ethylenedioxy-17-vinylidene-$5\alpha$-androstan-$16\alpha$-ol in 80 ml. of ether is added 1.0 g. of osmium tetroxide and 1 ml. of 3 percent aqueous hydrogen peroxide. The reaction mixture is allowed to stand at room temperature for 10 days and is then filtered. The ethereal filtrate is washed with sodium thiosulfate solution and water, dried over sodium sulfate and evaporated. The residue is purified on chromatographic magnesium silicate eluting with hexane and than with hexane: ethyl acetate (4:1) to yield 3,3-ethylenedioxy-$5\alpha$-pregnane-$16\alpha,17\alpha$,21-triol-20-one.

Hydrolysis of the ketal with hydrogen chloride in acetone affords $5\alpha$-pregnane-$16\alpha,17\zeta$,21-triol-3,20-dione,

EXAMPLE 11

Part A — $6\alpha$-Methyl-$9\alpha$-fluoro-17-vinylidene-$5\alpha$-androstane-$3\beta,11\beta$-diol Fifty milliliters of diethylene glycol monoethyl ether is made anhydrous and pretreated with zinc dust in accordance with the methods set forth in Examples 1 to 4, above. To this anhydrous, pretreated diethylene glycol monoethyl ether are added 2 g. of $6\alpha$-methyl-$9\alpha$-fluoro-$17\alpha$-ethynyl-$17\beta$-acetoxy-$5\alpha$-androstane-$3\beta,11\beta$-diol. To the resulting solution are added 50 g. of zinc dust in a portion-wise fashion and at room temperature while stirring. Following the addition of the zinc dust, 1 ml. of 36 percent hydrogen chloride solution is added to the reaction mixture. The reaction mixture is then heated at the boiling point for a period of three hours while maintaining the entire mixture under anhydrous conditions. Following the reflux period, the solution is filtered, concentrated, and the residue chromatographed to provide the $6\alpha$-methyl-$9\alpha$-fluoro-17-vinylidene-$5\alpha$-androstane-$3\beta,11\beta$-diol product.

Part B — $6\alpha$-Methyl-$9\alpha$-fluoro-$5\alpha$pregnane-$3\beta,11\beta$,$17\alpha$,21-tetraol-20-one A mixture of 25 g. of $6\alpha$-methyl-$9\alpha$-fluoro-17-vinylidene-$5\alpha$-androstane-$3\beta,11\beta$-diol and 1.5 l. of diisopropyl ether is added to a mixture of 102 g. of osmium tetroxide, 500 ml. of diisopropyl ether and 5 ml. of water. The resulting mixture is stirred for 4 days at 40° C., cooled and filtered. The filtrate is washed with aqueous sodium thiosulfate solution and water, dried over magnesium sulfate and evaporated. The residue is chromatographed on magnesium silicate eluting with isooctane to yield 6α-methyl-9α-fluoro-5α-pregnane-3β,11β,17α,21-tetraol-20-one.

EXAMPLE 12

Part A — 6β,16α-Dimethyl-17-vinylidene-5α-androstan-3β-ol

One hundred milliliters of anhydrous diethylene glycol dimethyl ether which has been pretreated with zinc is prepared as described in the foregoing examples, Part A. To this is added one gram of 6β,16α-dimethyl-17α-ethynyl-17β-propionyloxy-5α-androstan-3β-ol. To the resultant solution are added 10 g. of zinc dust in a portion-wise fashion with stirring and at room temperature. Following the addition of the zinc dust, the reaction mixture is heated to the boiling point and maintained under reflux conditions for a period of 15 hours. During the first 8 hours of the reflux period, measures are taken to maintain the reaction mixture anhydrous. Following the reflux period, the solution is filtered and the filtrate concentrated to provide a residue which is chromatographed on silica-gel to provide the 6β,16α-dimethyl-17-vinylidene-5α-androstan-3β-ol product.

Part B — 6β,16α-Dimethyl-17α-(3'-chlorobenzoyloxy)-5α-pregnan-3β-ol-20-one and 6β,16α-dimethyl-21-(3'-chlorobenzoyloxy)-5α-pregnane-3β,17α-diol-20-one To a solution of 1 g. of 6β,16α-dimethyl-17-vinylidene-5α-androstan-3β-ol dispersed in 20 ml. of chloroform are added 1.3 g. of 85 percent m-chloroperbenzoic acid. The resultant reaction mixture is allowed to stand at room temperature for 24 hours. After this period it is extracted with sodium bicarbonate, dried over sodium sulfate and evaporated. The residue after evaporation is chromatographed on florisil eluting with benzene: 2 percent ethyl acetate to provide the 6β,16α-dimethyl-17α-(3'-chlorobenzoyloxy)-5α-pregnan-3β-ol-20-one and 6β,16α-dimethyl-21-(3'-chlorobenzoyloxy)-5α-pregnane-3β,17α-diol-20-one.

EXAMPLE 13

In accordance with the methods of the foregoing Examples the following 17-vinylidene derivatives are prepared from the corresponding 17α-ethynyl-17β-acyloxy steroids:

6α-methyl-17-vinylideneandrost-4-en-3-one,
6α-methyl-17-vinylidenestr-4-en-3-one,
6α-fluoro-17-vinylideneandrost-4-en-3-one,
6α-fluoro-17-vinylidenestr-4-en-3-one,
6β-fluoro-17-vinylidenestr-4-en-3-one,
6α,7α-difluoromethylene-17-vinylideneandrost-4-en-3-one,
6α,7α-difluoromethylene-17-vinylidenestr-4-en-3-one,
6α,7α-methylene-17-vinylideneandrost-4-en-3-one,
1α,2α-difluoromethylene-17-vinylidenestr-4-en-3-one,
6-methyl-17-vinylideneandrosta-4,6-dien-3-one,
6-chloro-17-vinylidenestra-4,6-dien-3-one,
6-fluoro-17-vinylidenestra-4,6-dien-3-one,
17-vinylidenandrosta-1,4,6-trien-3-one,
6-chloro-17-vinylidenandrost-1,4,6-trien-3-one,
6α-chloro-17-vinylidenandrosta-1,4-dien-3-one,
17-vinylideneandrosta-1,4-dien-3-one,
17-vinylidenandrost-4-ene,
6α-methyl-17-vinylideneandrostane-3β,16α-diol,
6β,16α-dimethyl-9α-fluoro-17-vinylideneandrostane-3β,17β-diol,
6α-methyl-17-vinylideneandrostane-3β,11β-diol,
17-vinylideneandrostane-3β,16α-diol,
1α,2α-oxido-17-vinylideneandrostan-3β-ol,
17-vinylideneandrostane-3β,11β-diol,
6α-fluoro-17-vinylideneandrostan-3β-ol,
9α,11β-oxido-17-vinylideneandrostan-3β-ol,
16α,16β-difluoro-17-vinylideneandrostan-3β-ol,
6β-fluoro-17-vinylideneandrostane-3β,5α-diol,
1β,2α-methylene-17-vinylideneandrostan-3β-ol,
5,6-oxido-17-vinylideneandrostan-3β-ol,
16α-trifluoromethyl-17-vinylideneandrostan-3β-ol,
17-vinylideneandrostane-3β,11β-diol,
3β-acetoxy-4β-methyl-17-vinylidene androstane,
17-vinylideneandrostan-3β-ol, and
9α-fluoro-17-vinylideneandrostane-3β,11β-diol

EXAMPLE 14

In accordance with the methods hereof and particularly by means of the methods of the process described in Parts B of the appropriate foregoing examples, the above listed (Example 13) compounds can be converted to the corresponding 17α-hydroxy(acyloxy)-20-keto and 17α,21-dihydroxy(acyloxy)-20-keto compounds, to wit 6α-methylpregn-4-ene-17α,21-diol-3,20-dione,
6α-methyl-19-norpregn-4-ene-17α,21-diol-3,20-dione,
6α-fluoropregn-4-ene-17α,21-diol-3,20-dione,
6α-fluoro-19-norpregn-4-ene-17α,21-diol-3,20-dione,
6β-fluoro-19-norpregn-4-ene-17α,21-diol-3,20-dione, and so forth,
6α-methyl-21-acetoxypregn-4-en-17α-ol-3,20-dione,
6α-methyl-21-acetoxy-19-norpregn-4-en-17α-ol-3,20-dione,
6α-fluoro-21-acetoxypregn-4-en-17α-ol-3,20-dione,
6α-fluoro-21-acetoxy-19-norpregn-4-en-17αol-3,20-dione,
6β-fluoro-21-acetoxy-19-norpregn-4-en-17α-ol-3,20-dione, and so forth,
6α-methyl-17α-(3'-chlorobenzoyloxy)-pregn-4-ene-3,20-dione,
6α-methyl-17α-(3'-chlorobenzoyloxy)-19-norpregn-4-ene-3,20-dione,
6α-fluoro-17α-(3'-chlorobenzoyloxy)-pregn-4-ene-3,20-dione,
6α-fluoro-17α-(3'-chlorobenzoyloxy)-19-norpregn-4-ene-3,20-dione,
6β-fluoro-17α-(3'-chlorobenzoyloxy)-19-norpregn-4-ene-3,20-dione, and so forth,
6α-methyl-21-(3'-chlorobenzoyloxy)-pregn-4-en-17α-ol-3,20-dione,
6α-methyl-21-(3'-chlorobenzoyloxy)-19-norpregn-4-en-17α-ol-3,20-dione,
6α-fluoro-21-(3'-chlorobenzoyloxy)-pregn-4-en-17α-ol-3,20-dione,
6α-fluoro-21-(3'-chlorobenzoyloxy)-19-norpregn-4-en-17α-ol-3,20-dione, 6β-fluoro-21-(3'-chlorobenzoyloxy)-19-norpregn-4-en-17α-ol-3,20-dione, and so forth,
6α-methylpregnane-3β,16α,17α,21-tetraol-20-one,
6β16α-dimethyl-9α-fluoropregnane-3β,11β,17α,21-tetraol-20-one,
6α-methylpregnane-3β,11β,17α, 21-tetraol-20-one,
pregnane-3β,16α,17α,21-tetraol-20-one,
1α,2α-oxidopregnane-3β,17α,21-triol-20-one, and so forth,
3β,21-diacetoxy-6α-methylpregnane-16α,17α-diol-20-one,
3β,21-diacetoxy-6β,16α-dimethyl-9α-fluoropregnane-11β,17α-diol-20-one,
3β,21-diacetoxy-6α-methylpregnane-11β,17α-diol-20-one,
3β,16α,21-triacetoxypregnan-17α-ol-20-one,
1α,2α-oxido-3β,21-diacetoxypregnan-17α-ol-20-one, and so forth,
6α-methyl-17α-(3'-chlorobenzoyloxy)pregnane-3β,16α-diol-20-one,
6β,16α-dimethyl-9α-fluoro-17α-(3'-chlorobenzoyloxy) pregnane 3β,11β-diol-20-one,
6α-methyl-17α-(3'-chlorobenzoyloxy)pregnane-3β,11β-diol-20-one,
17α-(3'-chlorobenzoyloxy)pregnane-3β,16α-diol-20-one,
1α,2α 17α-(3'-chlorobenzoyloxy)pregnan-3β-ol-20-one, and so forth,
6α-methyl-21-(3'-chlorobenzoyloxy)pregnane-3β,16α,17-triol-20-one,
6β,16α-dimethyl-9α-fluoro-21-(3'-chlorobenzoyloxy)pregnane-3β,11β,17α-triol-20-one,
6α-methyl-21-(3'-chlorobenzoyloxy)pregnane-3β,11β,17-triol-20-one,
21-(3'-chlorobenzoyloxy)pregnane-3β,16α,17α-triol-20-one,
1α,2α-oxido-21-(3'-chlorobenzoyloxy)pregnane-3β,17α-diol-20-one, and so forth.

EXAMPLE 15

The procedure of Part B–3 of Example 7 is repeated utilizing trifluoroperacetic acid, peracetic acid, perbenzoic acid, and perphthalic acid in lieu of m-chloroperbenzoic acid to respectively prepare 3β-acetoxy-17α-trifluoroacetoxy-5α-pregnan-20-one, 3β-acetoxy-21-trifluoroacetoxy-5α-pregnan-17α-ol-20-one, 3β,17α-diacetoxy-5α-pregnan-20-one, 3β,21-diacetoxy-5α-pregnan-17α-ol-20-one, 3β-acetoxy-17α-benzoyloxy-5α-pregnan-20-one, 3β-acetoxy-21-benzoyloxy-5α-pregnan-17α-ol-20-one, 3β-acetoxy-17α-phthaloyloxy-5α-pregnan-20-one, and 3β-acetoxy-21-phthaloyloxy-5α-pregnan-17α-ol-20-one.

EXAMPLE 16

A solution of 10 g. of 17-vinylideneandrost-4-en-3-one in 125 ml. of dioxane is treated with 10 ml. of ethyl orthoformate and 1 g. of p-toluenesulfonic acid, and the reaction mixture is allowed to stand at room temperature for 6 hours. A few drops of pyridine are then added and the solvent is evaporated to dryness under reduced pressure. The solid residue is recrystallized from methylene chloridemethanol to yield 3-ethoxy-17-vinylideneandrosta-3,5-diene.

A mixture of 5 g. of 3-ethoxy-17-vinylideneandrosta-3,5-diene, 2g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-17-vinylideneandrost-4-en-3-one which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water and dried to yield 6α-chloro-17-vinylideneandrost-4-en-3-one which is recrystallized from acetone:hexane.

A mixture of 6 g. of 6β-chloro-17-vinylideneandrost-4-en-3-one, 100 ml. of dioxane, 7 ml. of ethyl orthoformate and 0.7 g. of p-toluenesulfonic acid is allowed to stand at room temperature for 1 ½ hours, it is then neutralized with pyridine and evaporated to dryness under reduced pressure. The residue is purified by chromatography on alumina, to give the pure 3-ethoxy-6-chloro-17-vinylideneandrost-3,5-diene.

A solution of 5 g. of 3-ethoxy-6-chloro-17-vinylidene-androsta-3,5-diene in 20 ml. of dioxane is cooled to 10° C. and treated with a mixture of 5.8 g. of 2,3-dichloro-5,6-dicyano-1,4-benzoquinone, 45 ml. of dioxane, 4 drops of water and 0.3 g. of p-toluenesulfonic acid, and the reaction mixture is stirred at 10° C. for 2 hours. It is then filtered through 250 g. of washed alumina, eluting the product with methylene chloride, thus affording 6-chloro-17-vinylideneandrosta-4,6-dien-3-one, which is further purified by recrystallization from methylene chloride-methanol.

To a solution of 1.95 g. of 6-chloro-17-vinylideneandrosta-4,6-dien-3-one in 50 ml. of dioxane is added 3.1 g. of 2,3-dichloro-5,6-dicyano-1,4-benzoquinone, and the mixture is refluxed under stirring for 20 hours. It is then cooled, the 2,3-dichloro-5,6-dicyano-1,4-benzohydroquinone is separated by filtration and the filtrate evaporated to dryness under reduced pressure. The residue is purified by thin layer chromatography, to provide 6-chloro-17-vinylideneandrosta-1,4,6-trien-3-one.

EXAMPLE 17

A solution of 1 g. of 3β-acetoxy-17-vinylidenestr-4-ene in 100 ml. of methanol is treated with 500 mg. of potassium hydroxide in 1 ml. of water and the mixture is refluxed for 1 hour. The reaction mixture is then poured into water and the solid which forms is collected by filtration, washed with water to neutrality and air dried. Crystallization from acetone-ether afforded the pure 3β-hydroxy-17-vinylidenestr-4-ene.

In a similar fashion, 3β-hydroxy-17-vinylidenestra-4,6-diene, 3β-hydroxy-17-vinylideneandrosta-4,6-diene and 3β-hydroxy-6α-methyl-17-vinylideneandrost-4-ene are obtained from the corresponding 3β-acetoxy compounds.

EXAMPLE 18

A mixture of 250 mg. of 3β-hydroxy-17-vinylidenestr-4-ene, 1 ml. of pyridine, and 1 ml. of propionic anhydride is allowed to stand at room temperature for 24 hours. The mixture is then poured into ice-water and the solid which forms is collected by filtration, washed with water and dried to yield 3β-propionoxy-17-vinylidenestr-4-ene which is further purified through recrystallization from acetone-hexane.

In a similar manner but using other carboxylic acid anhydrides in place of propionic anhydride v.g. caproic, valeric, enanthic and cyclopentylpropionic anhydride as esterifying agents the corresponding 3β-acyloxy-17-vinylidenestr-4-ene compounds are obtained.

EXAMPLE 19

To a solution of 1 g. of 3β-hydroxy-17-vinylidenestr-4-ene in 25 ml. of benzene is added 2 ml. of dihydropyran and approximately 5 ml. are distilled off to remove moisture. The mixture is then cooled to room temperature, 0.1 g. of p-toluenesulfonic acid is added and the resulting reaction mixture is held at room temperature for 24 hours. Following this reaction period the reaction mixture is washed with 5 percent aqueous sodium carbonate solution and water until neutral, dried over sodium sulfate and evaporated to dryness. The residue is purified by chromatography on alumina eluting the column with hexane, to furnish 3β-tetrahydropyran-2'-yloxy-17-vinylidenestr-4-ene, which is recrystallized from pentane.

In a similar manner 3β-hydroxy-17-vinylidenestra-4,6-diene, 3β-hydroxy-17-vinylideneandrosta-4,6-diene and 3β-hydroxy-6α-methyl-17-vinylideneandrost-4-ene are converted into the corresponding tetrahydropyran-2'-yl ethers.

EXAMPLE 20

To a solution of 5 g. of 3-ethoxy-17-vinylideneandrosta-3,5-diene (obtained as described in Example 16) in 100 ml. of acetone is added a solution of 2 g. of sodium acetate in 32 ml. of water, and the resulting mixture is cooled to 0°–5° C. Then, 1.1 molar equivalents of N-bromosuccinimide and 2 ml. of glacial acetic acid are added, and the reaction mixture is stirred for 30 minutes at 0°–5° C. At the end of this period the mixture is diluted with ice water and extracted with methylene chloride, the organic extracts are washed with water to neutral dried over sodium sulfate and evaporated to dryness under vacuo. Crystallization of the residue from acetone-ether affords the pure 6β-bromo-17-vinylideneandrost-4-en-3-one.

EXAMPLE 21

A solution of 6 g. of 17α-acetoxy-5α-pregnan-3βol-20-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 17α-acetoxy-5α-pregnane-3,20-dione which may be further purified by recrystallization from acetone:hexane.

Two equivalents of bromine in 15 ml. of glacial acetic acid are added dropwise to a solution of 1 g. of 17α-acetoxy-5α-pregnane-3,20-dione in 25 ml. of acetic acid containing a few drops of 4N hydrogen bromide in acetic acid. After being allowed to stand for five hours at room temperature, the mixture is poured into ice water and the solid which forms is collected by filtration, washed well with water and dried. This material is then refluxed for 14 hours with 2 g. of sodium iodide in 40 ml. of 2-butanone, allowed to stand at room temperature for 12 hours, diluted with water, and extracted with ether. These extracts are washed with sodium thiosulfate solution and water and evaporated under reduced pressure. The residue is dissolved in 35 ml. of acetone, and treated under carbon dioxide with an aqueous solution of 11 g. of chromic chloride. After allowing the mixture to stand at room temperature for 20 minutes, water is added and the mixture is extracted with ether. These extracts are washed with water to neutrality, dried and evaporated. The residue is mixed with 0.8g. of potassium carbonate in 35 ml. of methanol and 7 ml. of water and refluxed for 30 minutes. The mixture is extracted with chloroform and these extracts are chromatographed on alumina with 7:3 chloroform:benzene to yield 17α-acetoxypregn-4-ene-3,20-dione which is recrystallized from ether:hexane.

In the manner corresponding with that described above in this example, the other corresponding 3-hydroxy-5α compounds prepared as described above can be converted to the corresponding 3-keto-Δ⁴ compounds. In those instances in which the compound also contains a hydroxyl group which competes with the oxidation step (Paragraph 1 above) it is preferable to first protect these groupings such as by forming the 16,17-isopropylidenedioxy grouping in accordance with standard procedures or by standard etherification or esterification at C-16α and C-21. These procedures can be illustrated as follows.

To 120 ml. of acetone containing 1 g. of 5α-pregnane-3β,16α,17α,21-tetraol-20-one are added 30 drops of 70 percent perchloric acid. The mixture is allowed to stand 1 hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields 16α,17α-isopropylidenedioxy-5α-pregnan-3β,21-diol-20-one.

The latter prepared compound when treated in accordance with Paragraph No. 2 of the example is converted to 16α,17α-isopropylidenedioxypregn-4-en-21-ol-3,20-dione.

EXAMPLE 22

One gram of 21-acetoxypregn-5-ene-11β,17α-diol-3,20-dione is dissolved with slow heating in 12.5 ml. of dimethylformamide. To the cooled mixture is then added 0.42 g. of methanesulfonyl chloride and 0.5 ml. of pyridine. After heating the reaction mixture at 80° C. for 30 minutes it is cooled, diluted with water and extracted with ethyl acetate. The extracts are washed with water, dried over sodium sulfate and evaporated to yield 21-acetoxypregna-4,9(11)-dien-17α-ol-3,20-dione which may be further purified by recrystallization from acetone: hexane.

To a solution of 1.6 g. of 21-acetoxypregna-4,9(11)-dien-17α-ol-3,20-dione in 4 ml. of chloroform is added over a 5 minute period with continuous stirring, a solution of 0.3 g. of chlorine in 10 ml. of carbon tetrachloride. After being allowed to stand at room temperature for 20 minutes, the mixture is treated with 10 ml. of 5 percent aqueous sodium carbonate solution and extracted with chloroform. The chloroform extracts are washed with water to neutrality, dried over sodium sulfate and evaporated to dryness to yield 9α,11β-dichloro-21-acetoxypregn-4-en-17α-ol-3,20-dione which may be recrystallized from acetone:hexane.

EXAMPLE 23

To a suspension of 1 g. of 16α-methyl-21-acetoxypregn-4-ene-11β,17α-diol-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-16α-methyl-21-acetoxypregna-3,5-diene-11β,17α-diol-20-one which is recrystallized from acetone:hexane.

A mixture of 5 g. of 3-ethoxy-16α-methyl-21-acetoxypregna-3,5-diene-11β,17α-diol-20-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-16α-methyl-21-acetoxypregn-4-ene-11β,17α-diol-3,20-dione which is recrystallized from acetone. The corresponding 6α-chloro compound is obtained by dissolving this compound in glacial acetic acid and introducing a slow stream of anhydrous hydrogen chloride over a period of 4 hours and a temperature of 15° C. The solid which forms upon pouring this mixture into water is collected by filtration, washed with water and dried to yield 6α-chloro-16α-methyl-21-acetoxypregn-4-ene-11β,17α-diol-3,20-dione which is recrystallized from acetone:hexane.

EXAMPLE 24

A mixture of 0.5 g. of 9α,11β-dichloro-21-acetoxypregn-4-en-17α-ol-3,20-dione, 10 ml. of dioxane and 0.35 of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 9α,11β-dichloro-21-acetoxypregna-1,4-dien-17α-ol-3,20-dione which is further purified by recrystallization from acetone:hexane.

A mixture of 1 g. of 9α,11β-dichloro-21-acetoxypregn-4-en-17α-ol-3,20-dione, 2 g. of chloranil, 15 ml. of ethyl acetate and 5 ml. of acetic acid is refluxed under nitrogen for 96 hours. The mixture is then cooled and washed with cold 10 percent aqueous sodium hydroxide until the washings was colorless. The organic solution is dried over sodium sulfate and the ethyl acetate removed by evaporation. Upon chromatography of the residue on neutral alumina there is obtained 9α,11β-dichloro-21-acetoxypregna-4,6-dien-17α-ol-3,20-dione which may be further purified by recrystallization from acetone:hexane.

What is claimed is:

1. The process of preparing a compound of the formula

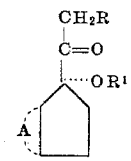

wherein A is the remainder of the steroid molecule comprising the A, B, and C rings, R is hydrogen, hydroxy or acyloxy, and R¹ is hydrogen or acyl which comprises the steps of
 a. treating a 17α-ethynyl-17β-acyloxy steroid of the estrane or androstane series with zinc in an ethylene glycol ether to yield the corresponding 17-vinylidene steroid and
 b. oxidizing the resulting 17-vinylidene steroid with an agent selected from the group consisting of osmium tetroxide, either alone or in combination with hydrogen peroxide; a percarboxylic acid, phenyliodoso acetate, and morpholine.

2. The process according to claim 1 wherein in step a) the ethylene glycol ether is a mono- or dilower alkyl ether of the diethylene glycol and triethylene glycol series and step b) is conducted with osmium tetroxide or a percarboxylic acid.

3. The process according to claim 1 wherein step (a) is conducted with zinc dust in diethylene glycol dimethyl ether at a temperature ranging from 140° C. to the boiling point of the reaction mixture and step (b) is conducted with osmium tetroxide or a percarboxylic acid at a temperature between 0° C. and the boiling point of the reaction mixture.

4. The process according to claim 1 wherein step (a) is conducted under anhydrous conditions employing anhydrous diethylene glycol dimethyl ether and zinc dust at a temperature of from 140° C. to the boiling point of the reaction mixture and step (b) is conducted at about room temperature under an inert gas atmosphere with osmium tetroxide in an inert organic ether solvent or with a percarboxylic acid in an inert hydrocarbon or halogenated hydrocarbon solvent.

5. The process according to claim 1 wherein in step (b) osmium tetroxide is employed to prepare the corresponding 17α,21-dihydroxy-20-ketopregnane.

6. The process according to claim 1 wherein in step (b) a percarboxylic acid is employed to prepare the corresponding 17α-acyloxy-20-ketopregnane and 17α-hydroxy-21-acyloxy-20-ketopregnane.

7. The process which comprises the step of treating a 17α-ethynyl-17β-acyloxy steroid of the estrane or androstane series with zinc in an ethylene glycol ether to yield the corresponding 17-vinylidene steroid.

8. The process according to claim 7 wherein the ethylene glycol ether is a mono- or dilower alkyl ether of the diethylene glycol and triethylene glycol series.

9. The process according to claim 7 conducted with zinc dust in diethylene glycol dimethyl ether at a temperature ranging from 140° C. to the boiling point of the reaction mixture.

10. A compound selected from the group of compounds represented by the formula:

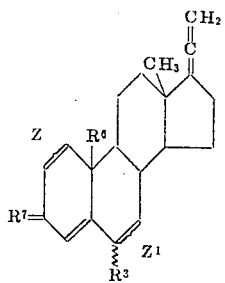

wherein,
$R^3$ is hydrogen, chloro, bromo, fluoro or methyl;
$R^6$ is hydrogen or methyl;
$R^7$ is oxo or the group $$R^9 \underset{\text{---}}{\overset{H}{\text{---}}}$$ in which $R^9$ is hydrogen, hydroxy or a conventional hydrolyzable ester or ether thereof;
each Z and $Z^1$ is a carbon-carbon single bond, a carbon-carbon double bond, or the group $$\underset{\text{---}}{\overset{\text{---}}{>}}\text{CXY in which each X and}$$

Y is hydrogen, fluoro, or chloro;
provided that when $R^6$ is hydrogen, Z is a carbon-carbon single bond.

11. The compound according to claim 10 wherein $R^6$ is methyl and $R^7$ is oxo.

12. The compound according to claim 10 wherein $R^6$ is hydrogen and $R^7$ is oxo.

13. The compound according to claim 10 wherein $R^7$ is the grouping $$R^9 \underset{\text{---}}{\overset{H}{\text{---}}}$$

in which $R^9$ is hydrogen, hydroxy or a conventional hydrolyzable ester or ether thereof.

14. The compound according to claim 11 which is 17-vinylideneandrost-4-en-3-one.

15. The compound according to claim 11, 6α-methyl-17-vinylideneandrost-4-en-3-one.

16. The compound according to claim 11, 6α-fluoro-17-vinylideneandrost-4-en-3-one.

17. The compound according to claim 11, 6β-chloro-17-vinylideneandrost-4-en-3-one.

18. The compound according to claim 1, 6-chloro-17-vinylideneandrosta-4,6-dien-3-one.

19. The compound according to claim 1, 6-chloro-17-vinylideneandrosta-1,4,6-trien-3-one.

20. The compound according to claim 11, 6α,7α-difluoromethylene-17-vinylideneandrost-4-en-3-one.

21. The compound according to claim 11, 1α,2α-difluoromethylene-17-vinylideneandrost-4-en-3-one.

22. The compound according to claim 12, 17-vinylidenestr-4-en-3-one.

23. The compound according to claim 12, 17-vinylidenestra-4,6-dien-3-one.

24. The compound according to claim 12, 6α-methyl-17-vinylidenestr-4-en-3-one.

25. The compound according to claim 13, 3β-hydroxy-17-vinylidenestr-4-ene and its acetate.

* * * * *